UNITED STATES PATENT OFFICE.

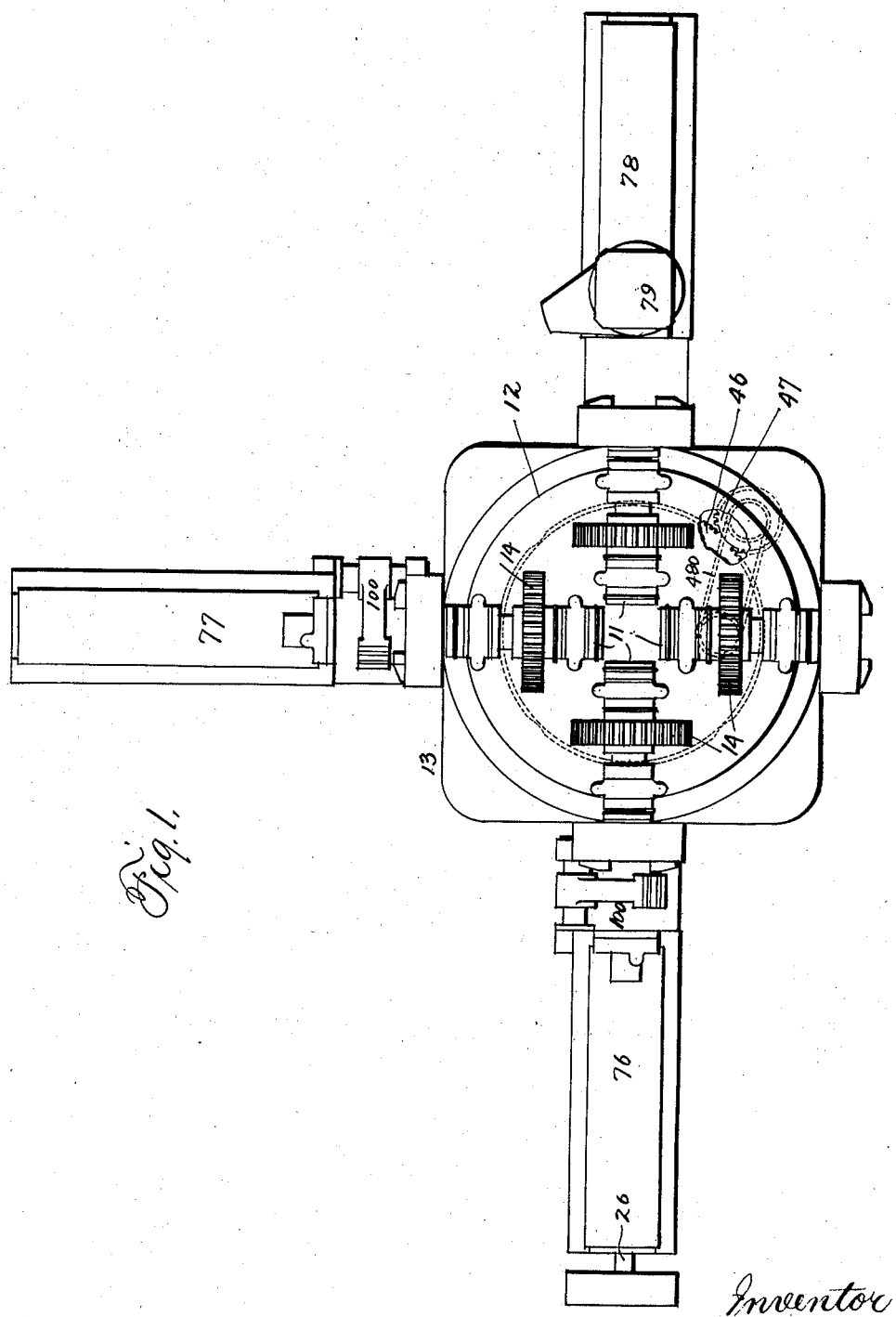

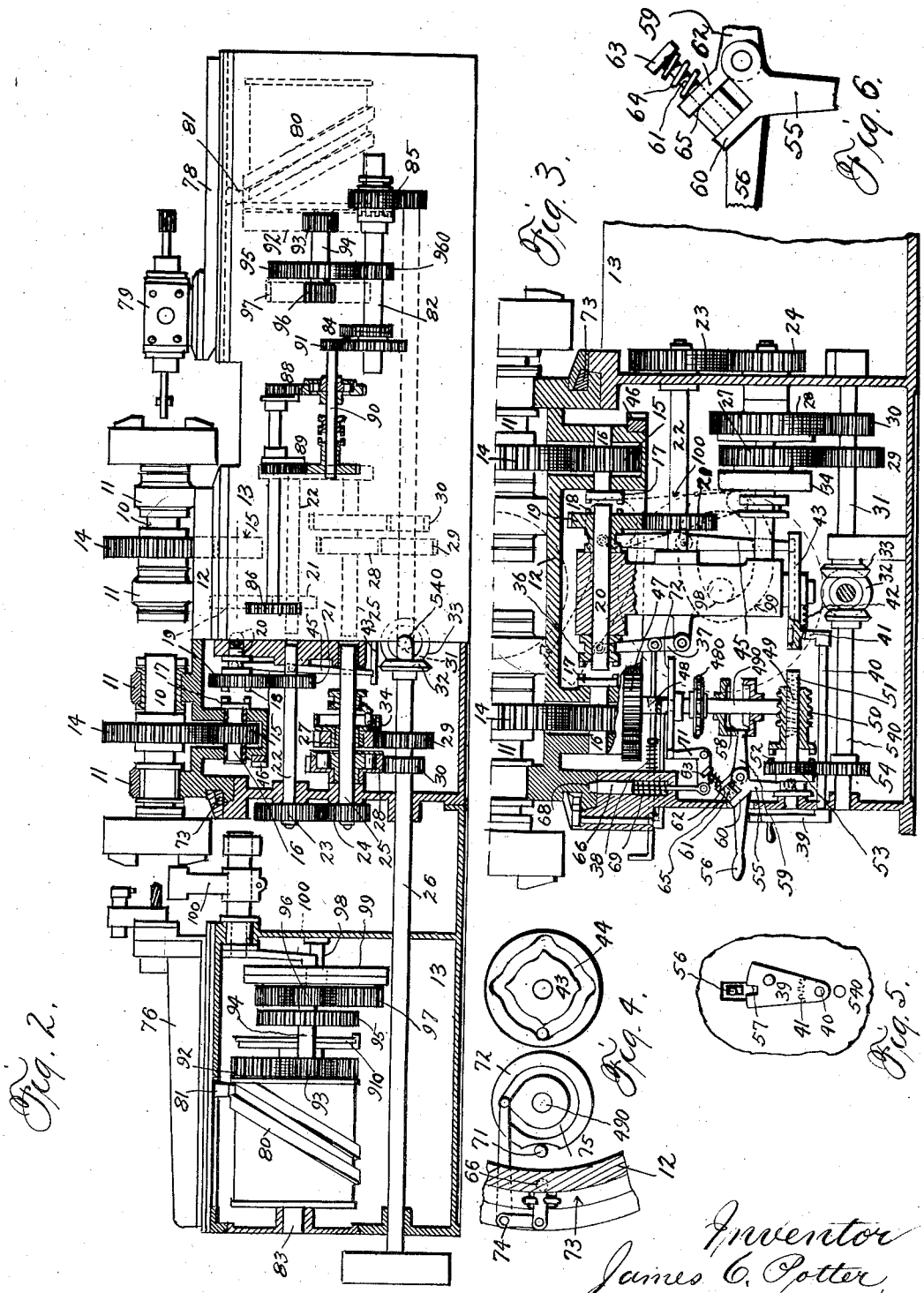

JAMES C. POTTER, OF PAWTUCKET, RHODE ISLAND.

METAL-WORKING MACHINE.

1,389,216. Specification of Letters Patent. Patented Aug. 30, 1921.

Application filed April 12, 1919. Serial No. 289,496.

*To all whom it may concern:*

Be it known that I, JAMES C. POTTER, a citizen of the United States, and a resident of Pawtucket, in the county of Providence and State of Rhode Island, have invented certain new and useful Improvements in Metal-Working Machines; and do hereby declare that the following is a full, clear, and exact description thereof.

My invention relates to metal working machines of the class in which the work is placed in a revolving chuck and the tools are carried by a slide, which reciprocates toward and from the chuck. Generally stated, my object is to provide a machine by which production will be greatly increased; floor space economized; cost reduced both by saving time in setting up the machine and in the number of tools required; and such work as the operator is required to do in tending the machine will be more convenient and less laborious for him, and with greater safety from injury from moving parts of the machine.

In the drawings:—

Figure 1, is a top plan view of a machine embodying my invention;

Fig. 2, is a view in side elevation and partly in longitudinal section;

Fig. 3, is a view partly in section from front to rear and partly in side elevation.

Fig. 4 is a detail view in horizontal section;

Fig. 5 is a detail view of the device for interlocking clutch and indexing mechanism;

Fig. 6 is a detail view of the clutch lever of the indexing mechanism.

Briefly described, the machine shown in the drawings, as an illustration of one embodiment of my invention, comprises a group or series of four work-spindles mounted on a rotary table or support, and arranged equi-distant apart, with their axes radiating from the support axis, which stands vertical, and a group of tool slides, each with its own reciprocating mechanism, also extending in lines that radiate from said support axis, and one less in number than the spindles. By the rotation of the group of spindles, the chuck of each, in turn will be presented for coaction with the tools of each of the three slides, and simultaneously, work will be going on at three stations, while at the fourth station, which is where the workman stands, new work can be placed in the chuck thereat, or finished work removed from such chuck. All movements of the machine are controlled at the workman's station.

The output of the machine is not merely equal to the product of the three members, or units of the organization, but it is much greater, due to the fact that if any one unit were equipped, by using a turret, with all the tools which are used on all three, its output would be limited to the time required for the longest operation, and while that tool was working, the others would be idle, whereas by distributing such tools among different, and simultaneously acting slides, as I do, and speeding up the slide, or slides, carrying tools that do not require so much time for their work, not only are all the tools simultaneously working, and time saved thereby, but time is additionally gained by such speeding up. Another important time-saving factor, (making the comparison with as many independent machines as there are units in my organization) is the combination of the units in one structure, for with independent machines tended by one workman, as is the practice, he loses time in going from one machine to another, both in setting up the machines and in placing work in and removing it from the chucks. Moreover, each independent machine must have its own complete tool-equipment, duplicating the tool-equipment of every other one, which means not only great tool expense, but expenditure of time in setting all the tools of all the machines in their holders. And, still making the same comparison, another matter making for increased output, is that with independent machines, it is possible for the workman to let one or more of a group which he is tending run idly while he is occupied with another one of his group, and with every appearance of being busy on his job, whereas he cannot fail to keep all units of my machine busy without neglect of his job being apparent. The chuck presented to the workman at his station is clear of machine parts over which the workman must laboriously reach and lift the work, some of which are revolving, and expose him to danger, so that time and labor are saved and danger eliminated in that particular. Such a machine as I illustrate, in the drawings, is capable of an output about five times that of a machine with a single work spindle and tool turret and similar in all other respects to one of the units of my said machine.

It is to be understood that I do not limit myself to a machine having four work spindles, for my invention, in its broadest aspect is the principle of plural number of spindles and an appropriate number of tool slides; nor do I restrict myself in other respects, to the machine structure shown in the annexed drawings.

Proceeding now with a detailed description of the machine shown in the drawings, the four work spindles 10 are mounted horizontally in bearings 11 on a table 12 mounted to revolve on a vertical axis in a frame or housing 13. On each spindle is fixed a spur gear 14 with which meshes a pinion 15 on a short shaft 16 in bearings on the underside of the table 12 and extending radially from the table axis. On its inner end said shaft 16 has a clutch face 17, adapted to be engaged by slidable clutch 18 carried by a gear 19 on a shaft 20 supported by the frame 13, into alinement with which the clutch face 17 associated with each spindle is brought by the rotation of the table 12. The gear 19 is driven at various speeds that are automatically selected, and its speed may also be varied by hand change gears, and thus when the clutch 18 is engaged with the clutch face 17, the spindle is revolved at the selected speed. The gear 19 meshes with a gear 21 on a horizontal shaft 22, and the latter, by hand change gears 23 and 24, receives motion from a shaft 25 which by two automatically controlled gear trains, receives motion at either of two speeds from the main driving shaft 26. Each of said two automatically controlled gear trains comprises two gears 27 and 28 of different diameter, loose on the shaft 25 and adapted, respectively, to be clutched to and unclutched therefrom, in alternation, and two gears 29 and 30 which mesh with the respective gears 27 and 28, and which, in two instances, are keyed to the main shaft 26, and in the third instance are keyed to a shaft 31 arranged at right angles to the main shaft and operatively connected therewith by bevel gears 32 and 33. Thus three out of the four spindles, are simultaneously driven for the performance of work, and driven from the same shaft 26, and each, without reference to the other is driven at the automatically selected speed required for the particular work to be done by the tool or tools, to which, at the time, the work is presented. The speed changes are effected, as is usual, by a dog wheel which actuates or causes the actuation of a friction clutch 34 that controls the connection of the gear 27 with its shaft 25. The clutch for the other gear 28 is of the automatic roll-type which becomes effective when the clutch 34 releases its gear 27 from the shaft 25. When a spindle is at the workman's station, it may be revolved for the workman to see if the work is centered in the chuck, and for that purpose I provide on the convenient shaft 20, a clutch collar 36 shiftable into clutching engagement with the clutch face 17 by a lever 37 having an operating handle placed in easy reach of the workman at the front of the machine. See Fig. 3. To assure that the clutch connection will be broken at the time the group of spindles is to be indexed and thus avoid danger of damage, I provide a spring 38 to disengage the clutch members when the hand lever is released.

All three clutch collars 18 are shiftable simultaneously from a single operating lever 39 at the workman's station, fixed to one end of a rock shaft 40 whose other end carries a gear segment 41 in mesh with a rack 42 on the underside of a disk 43 having in its upper side a cam path 44 which engages the lower end of a clutch lever 45 for each clutch 18.

For indexing the rotary spindle support 12, it has a large gear 46 mutilated at four equidistant points, with which meshes a mutilated pinion 47 on the upper end of a vertical shaft 48 geared by sprocket gearing 480 to a vertical shaft 490 having at its lower end a worm wheel 49, in mesh with a worm 50 loose on a horizontal shaft 51 and adapted to be clutched thereto by clutch teeth 52 on a gear 53 in mesh with a gear 54 on a shaft 540 driven from the main drive shaft 26. The clutch collar 52 is engaged by one arm of a lever 55 with a handle arm 56 at the workman's station, and projecting above the clutch operating lever 39, toward which it must move for shifting the clutches 18 into engagement with the clutch faces 17 to connect the spindles with the drive shaft. Said lever 55 can not be so moved until a notch 57 in the lever 39 alines with the handle arm 56, and it does not so aline until the lever 39 has been moved to the position to disengage the clutch members 17 and 18, and thus an interlocking arrangement is provided which makes it impossible for the indexing motion of the spindle-carrying table to take place with the clutch members in engagement.

As soon as the indexing motion through a quarter turn takes place, which is accomplished by one revolution of the indexing pinion 47, the worm 50 which drives the latter is unclutched by the automatic shifting of the clutch 52. For this purpose a cam 58 is fixed to the pinion shaft 490 which acts on a lever 59 that has a flexible connection with the clutch shipping lever 55 that permits said lever 55 to move in the direction to throw the clutch 52 to clutching position, but enables the cam-actuated lever 59 to move the lever 55 in the opposite direction to unclutch. Said lever 55 has a finger 60 from which projects a pin 61 through a finger 62 on the lever 59, and between the finger 62 and a head 63 on the pin 61 is a coil spring 64 which allows the independent movement of the lever 55 just mentioned, to throw the clutch, while between the two fingers 60 and 62 there is an enlargement of the pin 61 which forms a shoulder 65 which causes the lever 55 to be moved by the lever 59 when the finger 62 of the latter is pressed against such shoulder. At the time the lever 55 is operated to throw the clutch to 52 to drive the worm, the cam 58 is stationary, and, hence, prevents movement of the lever 59, and for that reason the spring or loose connection between the two levers is necessary in order that the lever 55 may be moved to throw its clutch 52.

The table 12 is locked by a bolt 66 that engages, in succession, each of four holes 68 in the underside of the table. A spring 69 forces said bolt upward into locking position, and it is moved downward by a bell crank lever 71, one arm of which is acted on by a cam 72 on the indexing pinion shaft 490. The cam 72 is a disk with a notch in its periphery into which the arm lever 71 falls when the bolt and one of the locking holes aline. The mutilated pinion and gear indexing device allows enough turning of the shaft 490 to release the locking bolt by the action of the cam disk 72, before the toothed portion of the pinion 47 meshes with the teeth of the table gear 46. For firmly holding the table 12 in indexed position, I employ, in addition to the locking bolt, a binder 73 in the form of a split ring, which is expanded for binding and relaxed to release the table, by a lever 74 actuated by a path cam 75 in the cam disk 72.

In the machine shown in the drawings, two of the tool slides are rams, they being the first slide 76, to which the work is presented, and the second slide 77 while the third and last slide 78 carries a turret 79. On the first slide, for example, may be placed a drill and a rough cutting tool, on the second, a boring bar, and on the turret may be placed suitable finishing tools. The slide-reciprocating mechanism is the same in each case, each slide having its own mechanism, which comprises a cam drum 80 which acts on a stud 81 on the underside of the slide, a feed shaft 82 to which the cam drum shaft 83 is geared, a differential gear 84 on the feed shaft through which the working speeds are communicated to the feed shaft, and a quick constant speed return gear connection 85 between the drive shaft and the feed shaft. As it is desirable to operatively tie up the spindle speed and feed, to preserve a constant ratio between them, the differential receives motion from the spindle drive, by a driving connection with the gear 21 on the shaft 22. Meshing with the gear 21 is a gear 86 on a shaft 87 having two gear trains 88 and 89 which connect with a shaft 90 on which is fixed the pinion 91 meshing with the differential gear 84. The two gear trains 88 and 89 are alternately clutched to the shaft 90, and drive it at different speeds, the slower train 88 having an automatic roll-type clutch for its wheel that is loose on the shaft 90 and the fastener train 89 having a sliding clutch collar for its gear that is loose on said shaft 90, and which is under the control of the dog wheel 910 on the drum shaft 83. Besides the automatic change of feed through the two gear trains 88 and 89, the latter include hand change gears to enable feed changes to be made.

The slide reciprocating mechanisms are geared so that the different slides move at different speeds, the turret slide being moved faster than either of the others. Thus, for example, if the operations of the tools of either the first or the second slide, or both, require twice as long as the operations of the turret tools, the turret slide will be moved twice as fast and thereby two operations performed in the time required for the operations of the ram tools, and, hence a material gain in the output of the machine be attained.

On the cam drum shaft 83 is a gear 92 with which meshes a pinion 93 on a shaft 94, and on the latter is a gear 95 with which meshes a pinion 960 on the feed shaft, and thus motion is imparted from the feed shaft to the cam drum.

On the shaft 94 is a pinion 96, which meshes with a gear 97 on a shaft 98 that has a path cam 99 that acts upon a swinging arm 100, that serves as a cross slide.

An important characteristic of my invention is the horizontal disposition of the work spindles and the tool slides because it eliminates gravity problems which a vertical disposition of the slides creates, permits the use of the cam drum slide-feeding means, means readier accessibility to the machine parts, and is otherwise advantageous.

From the description I have given, it will be seen that with the table 12 at rest, and while work is going on simultaneously at three of the chucks, the fourth chuck will be presented to the workman for removal of finished work or placing new work therein. As soon as the machine knocks off on the completion of the work of all the tools, which is done automatically, in the case of each unit, by the action of the dog wheel of the unit, the workman throws the lever 55 of the indexing mechanism to clutch the worm 50 to its shaft 51 to cause it to rotate the indexing shaft 48, which first, by means of cam disk 72 releases the binder 73 and then withdraws the locking bolt 66 from the table 12, and then turns the table through a quarter turn to shift the positions of the four chucks, whereupon the table is automatically locked in its new position, the clutch lever 39 is moved to engage the clutch members 17 and 18 to connect the three working spindles with power from the drive shaft 25, and the revolution of the cam drums commences to put the tool slides through their various motions.

What I claim is:—

1. A metal working machine comprising in a unitary organization, a group of independent tool carriers, each having its own path of travel all lying in the same plane, said path being horizontal, means for reciprocating said carriers, a group of horizontal work spindles all lying in the same plane, means for driving each spindle at various working speeds independent of the others, means whereby one group is movable relative to the other to place the individual spindles successively in working relation with tools carried by the individual carriers.

2. A metal working machine comprising in a unitary organization, a group of independent tool carriers, each having its own path of travel, said path being horizontal all lying in the same plane, means for reciprocating said carriers, a group of horizontal work spindles all lying in the same plane, means for driving each spindle at various working speeds independent of the others, means whereby one group is movable relative to the other to place the individual spindles successively in working relation with tools carried by the individual carriers, and means for feeding the tools in constant relation to the spindle speeds.

3. A metal working machine comprising in a unitary organization, a group of independent tool carriers, each having its own path of travel, said path being horizontal all lying in the same plane, means for reciprocating said carriers, a group of horizontal work spindles all lying in the same plane, means for driving each spindle at various working speeds independent of the others, means whereby one group is movable relative to the other to place the individual spindles successively in working relation with tools carried by the individual carriers, and means for feeding the tools in constant relation to the spindle speeds, comprising in each case a cam drum and gear connections between the same and the spindles.

4. A metal working machine comprising in a unitary organization, a group of tool slides, each having its own path of travel and all in the same horizontal plane, a feed mechanism for each slide comprising a cam drum, a group of work spindles within and concentric to the group of slides and all in the same horizontal plane, a rotatable table on which the spindles are mounted, trains of gearing for driving the spindles at different working speeds, and means driving the cam drums for feeding motions of the slides in constant relation to the spindle speeds.

5. A metal working machine comprising in a unitary organization, a group of tool slides, each having its own path of travel, a feed mechanism for each slide comprising a cam drum, a group of work spindles within and concentric to the group of slides, the spindle being one more in number than the slides, a rotatable table on which the spindles are mounted, a driving shaft, separate driving connections between said shaft and the respective cam drums, and variable speed driving connections between said shaft and the spindles.

6. A metal working machine comprising a group of tool slides each having its own path of travel, a feed mechanism for each slide comprising a cam drum, a group of work spindles, a table rotatable on a vertical axis supporting the spindles in the same horizontal plane, a driving shaft, separate driving connections between said shaft and the respective cam drums, a plurality of variable speed mechanisms stationarily mounted and all receiving motion from said driving shaft, and separable driving connections between said variable speed mechanism and said spindles whereby the spindles may be moved with said table independently of said variable speed mechanisms.

7. A metal working machine comprising in a unitary organization, a group of tool slides, at least one being a ram and at least one carrying a turret, each having its own path of travel, a feed mechanism for each slide comprising a cam drum, a group of spindles, and a rotatable table on which the spindles are mounted.

8. A metal working machine comprising in a unitary organization, a group of tool slides, each having its own path of travel, said path radiating from a common center, a feed mechanism for each slide comprising a cam drum, a group of work spindles within and concentric to the group of slides, the spindles being one more in number than the slides, a rotatable table on which the spindles are mounted, trains of gearing for driving the spindles at different working speeds, and means driving the cam drums for feeding motion of the slides in constant relation to the spindle speeds.

9. A metal working machine comprising in a unitary organization, a group of tool slides, each having its own path of travel, said path radiating from a common center, a feed mechanism for each slide comprising a cam drum, a group of work spindles within and concentric to the group of slides, the spindles being one more in number than the slides, a rotatable table on which the spindles are mounted, trains of gearing for driving the spindles at different working speeds, means driving the cam drums for feeding motion of the slides in constant relation to the spindle speeds, and means for driving the cam drums for non-feeding motion of the slides at high and constant speed.

10. A metal working machine comprising in a unitary organization a group of tool slides, each having its own path of travel, said paths radiating from a common center, a feed mechanism for each slide comprising a cam drum, a group of work spindles within and concentric to the group of slides, the spindles being one more in number than the slides, a rotatable table on which the spindles are mounted, a driving shaft, separate driving connections between said shaft and the respective cam drums, and variable speed driving connections between said shaft and the spindles.

11. A metal working machine comprising in a unitary organization, a group of tool slides, at least one being a ram and at least one carrying a turret, each having its own path of travel, said paths radiating from a common center, a feed mechanism for each slide comprising a cam drum, a group of work spindles within and concentric to the group of slides, the spindles being one more in number than the slides, and a rotatable table on which the spindles are mounted.

In testimony that I claim the foregoing, I have hereunto set my hand.

JAMES C. POTTER.